United States Patent [19]

Sokolov et al.

[11] 4,215,100

[45] Jul. 29, 1980

[54] METHOD OF PRODUCING POTASSIUM SULFATE

[76] Inventors: Igor D. Sokolov, Zanevsky prospekt, 32, kv. 200; Vera A. Ostanina, ulitsa Morisa Toreza, 20, kv. 61; Jury S. Safrygin, ulitsa Dekabristov, 29, kv. 36; Tatyana I. Rutkovskaya, ulitsa Artilleriiskaya, 1, kv. 684; Nina V. Antonova, ulitsa Chekistov, 44, kv. 103; Rakhil E. Naginskaya, ulitsa Sofiiskaya, 26, kv. 32, all of Leningrad, U.S.S.R.

[21] Appl. No.: 907,284

[22] Filed: May 18, 1978

[51] Int. Cl.² ................................................ C01D 5/08
[52] U.S. Cl. ..................................................... 423/552
[58] Field of Search ............... 423/197, 199, 551, 552, 423/499; 23/302

[56] References Cited

U.S. PATENT DOCUMENTS

| | | | |
|---|---|---|---|
| 1,936,070 | 11/1933 | Ritchie et al. | 423/552 |
| 1,990,896 | 2/1935 | Conwell | 423/552 |

FOREIGN PATENT DOCUMENTS

| | | | |
|---|---|---|---|
| 410830 | 5/1934 | United Kingdom | 423/552 |
| 439287 | 11/1935 | United Kingdom | 423/552 |
| 460281 | 1/1937 | United Kingdom | 423/552 |
| 464040 | 4/1937 | United Kingdom | 423/552 |

OTHER PUBLICATIONS

Gilliot, Andre, Etude des Equilibres en Solution Hydroammoniacale Pour le System Reciproque, CL—SO$_4$=K+Na+, Bull. Soc. Chim. France, M 1951, pp. 992–1002.

*Primary Examiner*—O. R. Vertiz
*Assistant Examiner*—Gary P. Straub
*Attorney, Agent, or Firm*—Haseltine, Lake & Waters

[57] ABSTRACT

A method of producing potassium sulfate consists in conversion of sodium sulfate with potassium chloride in an aqueous medium to yield glaserite and a glaserite solution. Then, the glaserite is decomposed with potassium chloride in water to obtain potassium sulfate and a sulfate solution which is returned to the first stage of conversion. The glaserite solution is cooled at temperatures ranging from +3° to −8° C., whereby mirabilite and a chloride solution are formed, the latter being evaporated to obtain sodium chloride and a concentrated chloride solution. Finally, the concentrated chloride solution is mixed with mirabilite, and the resulting suspension is delivered to the first stage of conversion of sodium sulfate with potassium chloride. The proposed method permits producing high-quality potassium sulfate with full utilization of the return solutions. The yield of potassium sulfate reaches 98.6% at a K$_2$O content of up to 53% by weight.

1 Claim, No Drawings

METHOD OF PRODUCING POTASSIUM SULFATE

FIELD OF THE INVENTION

The present invention relates to production of chlorine-free potassic fertilizers, and more particularly to a method of producing potassium sulfate.

Potassium sulfate produced by the proposed method may find extensive application in agriculture for crops exhibiting a negative reaction to the chlorine ion.

DESCRIPTION OF THE PRIOR ART

Known in the art is a two-stage process of producing potassium sulfate; the first stage involving obtaining of glaserite and a glaserite solution from potassium chloride, sodium sulfate and water, while the second stage involves decomposition of the glaserite with a potassium chloride solution into potassium sulfate and a sulfate solution. The glaserite solution contains a substantial amount of potassium, therefore it is possible to considerably increase the percentage of potassium extraction through utilization. In the case of disposal of the glaserite solution, the extraction of potassium does not exceed 70%. The glaserite solution can be utilized by evaporation or crystallization. Depending on the adopted procedure, evaporation of the glaserite solution may result in precipitation of sodium chloride or a mixture of sodium chloride with sodium sulfate, while cooling of the solutions concentrated by evaporation results in crystallization of glaserite. In this case, the latter is contaminated with halite, which renders it practically impossible to produce high-quality potassium sulfate from such glaserite. Dilution of the solution being cooled with water permits obtaining quality glaserite, but its yield is only 5 to 10% of the theoretical. In addition, as a result of evaporation of the glaserite solutions, a thick crust of glaserite, difficult to remove, is formed on the apparatus surface, which reduces the heat transfer coefficient, the sulfate ion utilization factor, in this case, does not exceed 73%, while dumping the salt slurry which is a mixture of halite and sodium sulfate into fields and water basins causes pollution of the environment.

Also known is a three-stage process of producing potassium sulfate. At the first stage, a mixture of glaserite and halite is formed, at the second stage, the halite is dissolved and potassium chloride is crystallized, and at the third stage, the mixture of potassium chloride and glaserite is decomposed to yield potassium sulfate. The solution produced at the first stage, saturated with glaserite and sodium chloride, is disposed of. Thus, no more than 75% of potassium is extracted.

According to another known method, potassium sulfate is produced from a mixture of potassium and sodium sulfates by way of conversion with potassium chloride. This method is applicable while processing the waste of alumina production. The solution obtained after separation of glaserite is evaporated and crystallized under vacuum to produce a solid phase which is a mixture of glaserite and potassium chloride, returned for conversion, whereas the solution containing sodium and potassium sulfates, caustic soda, sodium carbonate and sodium aluminate is dumped. The percentage of extraction of potassium and sulfate ions is considerably reduced.

There is also known a two-stage process of producing potassium sulfate through an intermediate product, viz. glaserite. According to this process, a glaserite solution is cooled at temperatures ranging from 0° to −5° C. Sodium sulfate is converted with potassium chloride for 6 hours at a temperature of 35° C., and the resulting suspension is stirred for 16 hours. The most serious disadvantage of this process is its being long. In addition, the solution obtained as a result of cooling the glaserite solution is distilled dry by consecutive evaporation and cooling to yield crystalline potassium chloride and sodium chloride contaminated with sodium and potassium sulfates. The potassium and sulfate ions are irretrievably lost, which reduces the extraction percentage of the useful components and does not permit obtaining sodium chloride commercially.

SUMMARY OF THE INVENTION

It is an object of the present invention to provide a method of producing potassium sulfate, permitting an increase in the extraction percentage of potassium and sulfate ion, commercial production of sodium chloride, and a higher purity of the end products.

With this and other objects in view, the invention resides in a method of producing potassium sulfate by way of conversion of sodium sulfate with potassium chloride in an aqueous medium to yield glaserite and a glaserite solution, conversion of the obtained glaserite with potassium chloride in an aqeuous medium to yield potassium sulfate and a sulfate solution which is returned to the stage of conversion of sodium sulfate with potassium chloride, cooling of the resulting glaserite solution at temperatures ranging from +3° to −8° C., whereby mirabilite and a chloride solution are formed, the latter solution being evaporated to obtain sodium chloride and a concentrated chloride solution, wherein, according to the invention, the concentrated chloride solution is mixed with mirabilite, and the resulting suspension is delivered to the stage of conversion of sodium sulfate with potassium chloride.

DETAILED DESCRIPTION OF THE INVENTION

The proposed method of producing potassium sulfate is realized as follows:

The process is conducted in two stages. At the first stage, fed simultaneously with sodium sulfate and potassium chloride and in a given ratio is a suspension obtained at the stage of utilization of the return solutions. The process of obtaining glaserite at the first stage is conducted at a temperature of 15° to 50° C. In a continuous process, the reaction takes 15 to 60 minutes. The resulting glaserite suspension is delivered via settlers to thickeners, then to a centrifuge at a liquid-to-solid phase ratio of 0.7 to 1.0, wherein glaserite is separated from a solution having the following composition, in % by weight: $Na_2SO_4$—5 to 6; KCl—7 to 7.5; NaCl—16 to 17; $H_2O$—the balance (at 20° to 25° C.), hereinafter called "glaserite solution". This solution is then delivered for cooling, while the glaserite is transferred to the second stage at which it is decomposed into potassium sulfate in the presence of potassium chloride and water.

The process of glaserite decomposition is conducted at a temperature of 15° to 50° C. for 15 to 60 minutes. The resulting suspension of potassium sulfate and a sulfate solution of the following composition, in % by weight: $Na_2SO_4$—2 to 3; KCl—21; NaCl—4 to 5; $H_2O$—the balance (at 20° to 25° C.), is clarified in a settler and fed to a thickener. The clarified sulfate solution is accumulated in an intermediate vessel wherefrom it is returned to the first stage of conversion, whereas the concentrated potassium sulfate suspension is delivered to a centrifuge where potassium sulfate is separated, washed with water in an amount of 5% of the solid phase, and dried.

To enhance the percentage of extraction of the potassium and sulfate ions into the product, the glaserite solution is cooled at temperatures ranging from +3° to −8° C. The solution is fed into ammonia-cooled crystallizers. Therewith, mirabilite is frozen out. Cooling of the glaserite solution at a higher temperature may result in a lower yield of mirabilite, while at lower temperatures the obtained mirabilite contains a considerable amount of undesirable impurities of sodium chloride.

The suspension obtained as a result of cooling the glaserite solution is delivered to a thickener wherefrom a chloride solution containing, in % by weight: $Na_2SO_4$—1 to 2; KCl—7 to 8; NaCl—19 to 20; $H_2O$—the balance (at 0° C.), is delivered for evaporation, while mirabilite is fed to a filter.

As the chloride solution is being evaporated, sodium chloride forms a solid phase. The suspension obtained by evaporation is fed, via a thickener and a settler, to a centrifuge from which the filtered and washed sodium chloride is delivered for drying.

A chloride solution concentrated by evaporation and containing, in % by weight: $Na_2SO_4$—3 to 4; KCl—15 to 16; NaCl—17 to 18; $H_2O$—the balance (at about 100° C.), is mixed in an intermediate vessel with the obtained mirabilite, and the resulting suspension is delivered to the first stage of conversion.

In the above-described arrangement, one can use, as the starting sulfate-containing material, not only anhydrous sodium sulfate, but also mirabilite ($Na_2SO_4.10H_2O$). To avoid the possible water unbalance there is, delivered to the first stage either a mixture of the starting mirabilite with anhydrous sodium sulfate or a sulfate solution which is returned to the glaserite production stage after having been evaporated. In addition, the above arrangement permits producing potassium sulfate from the waste of from alumina production and production of synthetic fatty acids which are essentially sodium sulfate containing soda. To neutralize the latter, an equivalent amount of sulfuric acid is added.

The proposed method enables high-quality potassium sulfate to be obtained. The evaporation of the cooled chloride solution presents no problems since no supersaturated solutions are formed therewith, whereas blending the hot chloride solution concentrated by evaporation and resulting from the separation of sodium chloride with mirabilite and feeding the resulting suspension to the first stage of conversion permits obtaining high-quality glaserite, hence, potassium sulfate.

The yield of potassium sulfate in this process reaches 98.6%, while that of common salt is 97.7%. The content of $K_2O$ in the potassium sulfate is about 50%, and can be increased to 53% by washing. The content of NaCl in common salt after washing with water may be as high as 99.2%.

Owing to mixing the concentrated chloride solution with mirabilite to obtain a suspension which is returned to the first stage of conversion, the proposed method of producing potassium sulfate offers the following advantages:

It permits producing high-quality potassium sulfate with full utilization of the return solutions;

it permits producing common salt of commercial grade;

it enables a substantial reduction in the duration of the process of converting sodium sulfate with potassium chloride;

it reduces the power requirements for evaporating the glaserite solution and crystallizing sodium chloride.

For a better understanding of the present invention, the proposed method will now be illustrated by specific examples of its realization.

Example 1

Added to 2,538 kg of a sulfate solution containing, in % by weight: $Na_2SO_4$—2 to 2.5; KCl—20 to 21; NaCl—5; $H_2O$—the balance, and obtained at the stage of glaserite decomposition were 0.795 kg of commercial sodium sulfate, 0.100 kg of potassium chloride, 3.390 kg of a sulfate suspension containing 2.801 kg of a concentrated chloride solution having the following composition, in % by weight: $Na_2SO_4$—4; KCl—15 to 16; NaCl—17 to 18; $H_2O$—the balance, and 0.589 kg of mirabilite, as well as 0.458 kg of water.

The resulting reaction mixture was stirred for 1 hour at a temperature of 25° C. and separated by filtration. Obtained after filtration were 1.013 kg of glaserite and 6.268 kg of a glaserite solution containing, in % by weight: $Na_2SO_4$—5 to 6; KCl—7 to 8; NaCl—17; $H_2O$—the balance. The glaserite was treated with a potassium chloride solution (0.711 kg of KCl and 1.814 kg of water) at a temperature of 30° C. for 45 minutes to obtain 1 kg of potassium sulfate and 2.538 kg of a sulfate solution which was returned to the first stage of conversion.

6.268 kg of the glaserite solution were cooled to 0° C. The resulting crystals of mirabilite in an amount of 0.589 kg were separated, and 2.231 kg of water were evaporated from 5.679 kg of the resulting chloride solution of the following composition, in % by weight: $Na_2SO_4$—2; KCl—8; NaCl—20; $H_2O$—the balance. The common salt produced after evaporation, in an amount of 0.647 kg, was separated from the concentrated chloride solution, whereafter 2.801 kg of the solution were mixed with the mirabilite which had been frozen out, and the resulting sulfate suspension was delivered to the first stage of conversion.

The content of $K_2O$ of the unwashed potassium sulfate was 50% by weight.

EXAMPLE 2

Used as the starting sulfate-containing material to produce potassium sulfate was mirabilite ($Na_2SO_4.10H_2O$). To 1.883 kg of mirabilite were added 0.100 kg of potassium chloride, 1.918 kg of a concentrated sulfate solution of the following composition, in % by weight: $Na_2SO_4$—2 to 3; KCl—24 to 25; NaCl—9 to 10; $H_2O$—the balance, 3.440 kg of a sulfate suspension containing 0.598 kg of mirabilite and 2.858 kg of a concentrated chloride solution of the following composition, in % by weight: $Na_2SO_4$—4; KCl—15 to 16; NaCl—17 to 18; $H_2O$—the balance. Obtained as a result were 1.013 kg of glaserite and 6.344 kg of a glaserite solution of the following composition, in % by weight: $Na_2SO_4$—5 to 6; KCl—7 to 8; NaCl—17; $H_2O$—the balance. The glaserite was treated with a potassium chloride solution (0.710 kg of potassium chloride and 1.815 kg of water) at a temperature of 30° C. for 45 minutes to obtain 1 kg of potassium sulfate and 2.538 kg of a sulfate solution of the following composition, in % by weight: $Na_2$-

$SO_4$—2; KCl—18 to 20; NaCl—6 to 7; $H_2O$—the balance. The sulfate solution was evaporated, the amount of evaporated water being 0.620 kg. The resulting concentrated solution was returned to the first stage of conversion.

6.344 kg of the glaserite solution were cooled to $-3°$ C. The resulting mirabilite crystals, in an amount of 0.598 kg, were separated on a filter, while evaporated from the obtained 5.761 kg of a chloride solution of the following composition, in % by weight: $Na_2SO_4$—2; KCl—8; NaCl—20; $H_2O$—the balance, were 2.247 kg of water. The 0.656 kg of common salt obtained after evaporation were separated from the concentrated chloride solution, whereafter the solution mixed with the obtained mirabilite was delivered to the first stage of conversion.

The $K_2O$ content in the unwashed potassium sulfate was 50% by weight.

EXAMPLE 3

Used as the starting material was the waste from the production of synthetic fatty acids which are essentially sodium sulfate containing soda. The process was conducted in a manner similar to Example 1 with the exception that an equivalent amount of sulfuric acid was added at the glaserite producing stage to neutralize the soda.

The content of $K_2O$ in the obtained unwashed potassium sulfate was 50% by weight.

What is claimed is:

1. A cyclic method of producing potassium sulfate consisting of the steps of
    (1) subjecting sodium sulfate to conversion with potassium chloride in an aqueous medium to yield a precipitate of $K_6Na_2(SO_4)_4$ and a first mother liquor;
    (2) subjecting the precipitated $K_6Na_2(SO_4)_4$ to conversion with aqueous potassium chloride to yield a precipitate of $K_2SO_4$ and a second mother liquor;
    (3) returning said second mother liquor to step (1);
    (4) cooling said first mother liquor from step (1) at temperatures ranging from $+3°$ to $-8°$ C. to yield a precipitate of $Na_2SO_4.10H_2O$ and a third mother liquor;
    (5) evaporating said third mother liquor from step (4) to obtain solid sodium chloride and a fourth mother liquor;
    (6) mixing said $Na_2SO_4.10H_2O$ from step (4) with said fourth mother liquor from step (5) to produce a suspension of $K_6Na_2(SO_4)_4$; and
    (7) returning the suspension of $K_6Na_2(SO_4)_4$ from step (6) to the aqueous medium in step (1).

* * * * *